June 6, 1967  J. B. MAPES, JR  3,323,756
AERIAL TOWING APPARATUS

Filed Aug. 18, 1965  4 Sheets-Sheet 1

INVENTOR.
JOHN B. MAPES, JR.
BY Harry M. Saragovitz,
Edward J. Kelly, Herbert Berl
& James W. Colvin
ATTORNEYS June 6, 1967  J. B. MAPES, JR  3,323,756
AERIAL TOWING APPARATUS
Filed Aug. 18, 1965  4 Sheets-Sheet 2
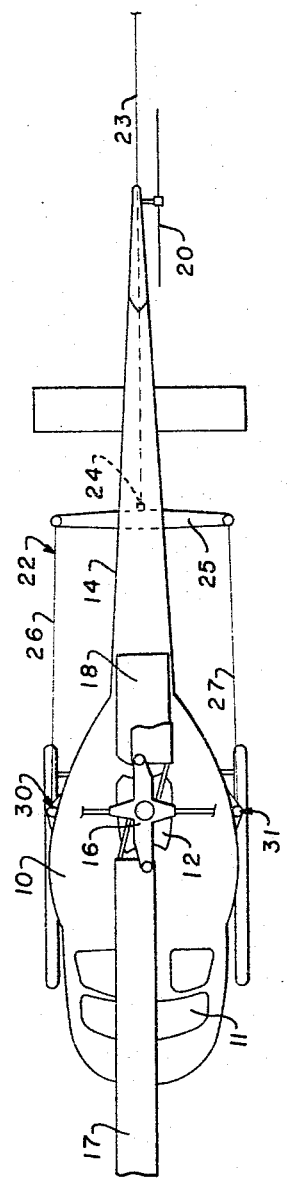
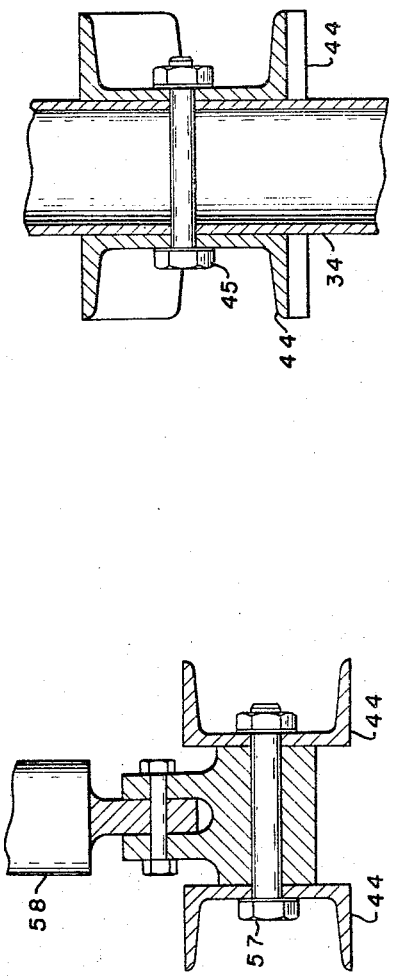
INVENTOR.
JOHN B. MAPES, JR.
BY Harry M. Sarazovitz,
Edward J. Kelly, Herbert Berl
& James W. Colvin
ATTORNEYS

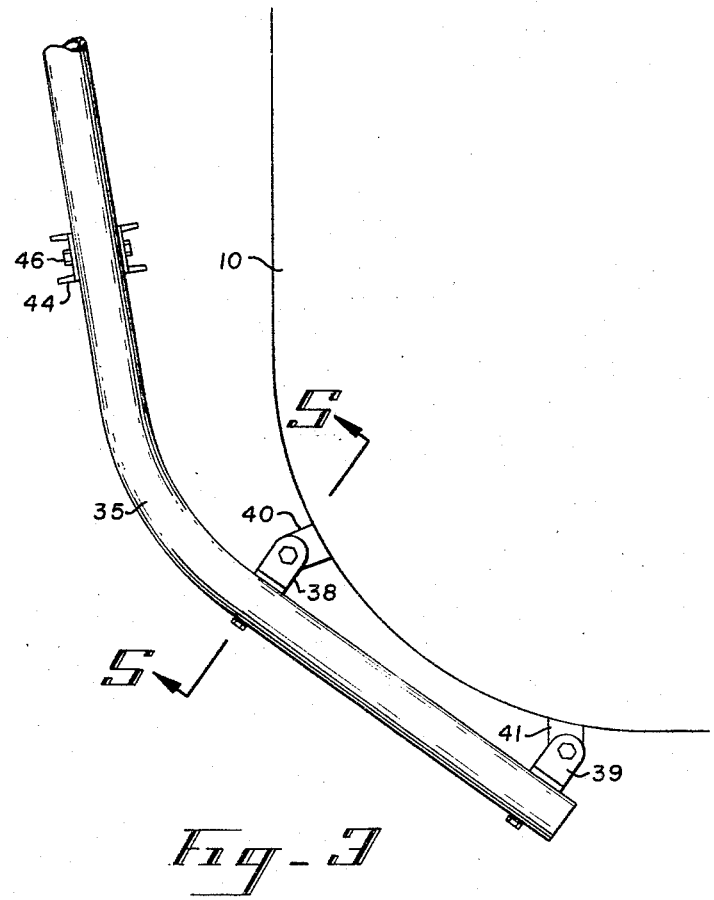
Fig_3
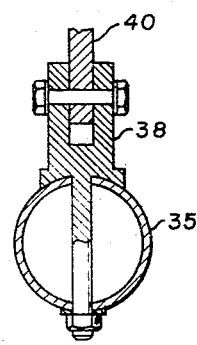
Fig_5
INVENTOR.
JOHN B. MAPES, JR.
BY Harry M. Saragovitz,
Edward J. Kelly, Herbert Berl
& James W. Colvin
ATTORNEYS

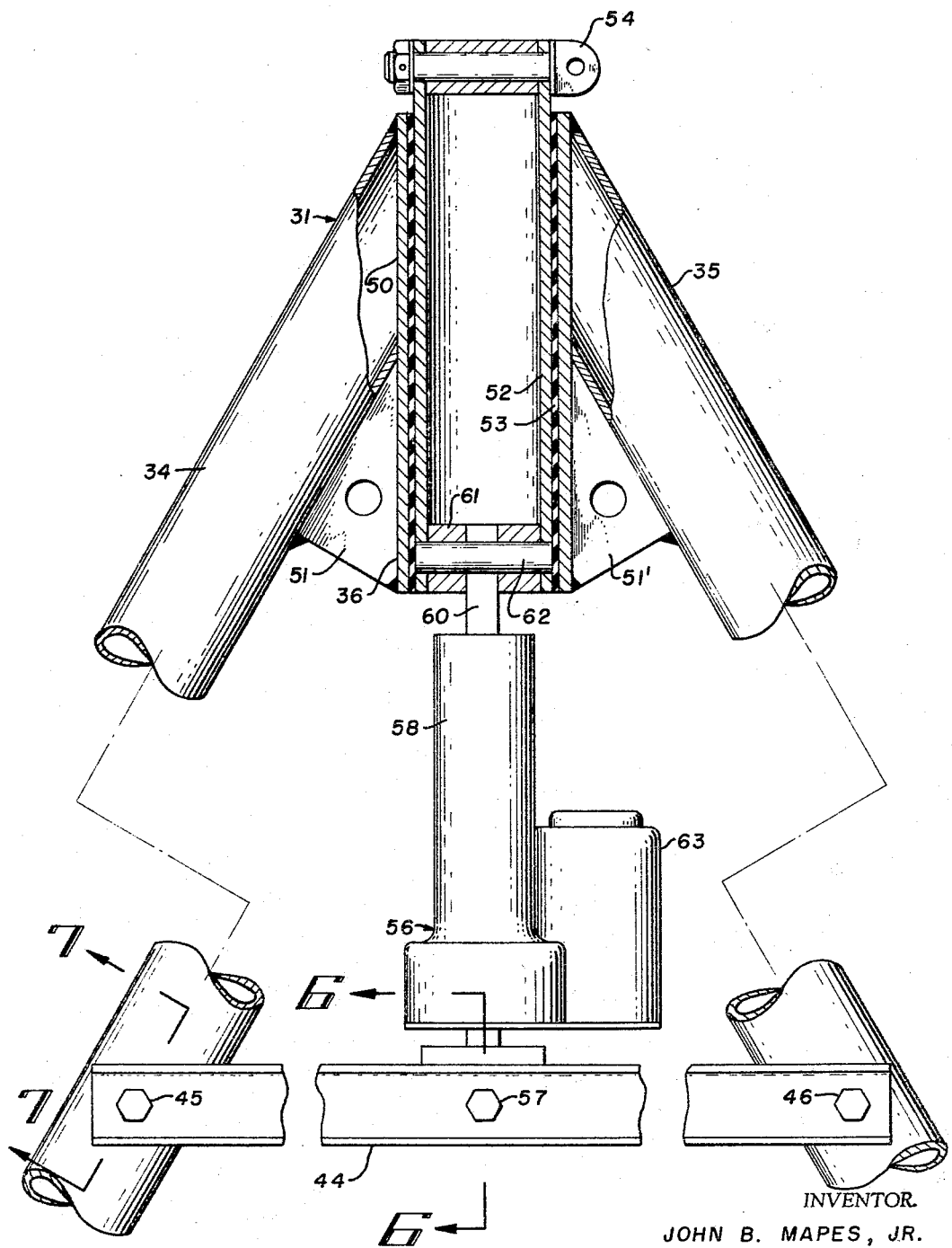

United States Patent Office 3,323,756
Patented June 6, 1967

3,323,756
AERIAL TOWING APPARATUS
John B. Mapes, Jr., Fort Eustis, Va., assignor to the United States of America as represented by the Secretary of the Army
Filed Aug. 18, 1965, Ser. No. 480,830
3 Claims. (Cl. 244—3)

ABSTRACT OF THE DISCLOSURE

An aerial towing apparatus for connecting a towing helicopter to a towed glider, the helicopter having a bracket on each side thereof and each bracket having means operable by the pilot of the helicopter for adjusting its height. A bridle connected by a line to each bracket is releasably connected to a tow line which is connected to the towed glider, the releasing means also being under control of the helicopter pilot.

---

The invention disclosed herein may be manufactured and used by or for the Government for governmental purposes without payment to me of any royalty thereon.

This invention relates to aerial towing apparatus and has particular reference to apparatus by means of which a load carrying glider is towed by a rotary wing aircraft or helicopter.

It has been found that the load carrying capacity of helicopters can be greatly increased and that military loads or cargo can be delivered to field locations with greatly improved convenience and precision by means of towed gliders. Suitable gliders have been developed for this purpose and apparatus has been provided to connect the gliders to helicopters for towing operations. It has been found that in glider towing operations the helicopter is subjected to an undesirable operating condition referred to by helicopter pilots as stick reversal, and it is a principal objective of this invention to minimize or eliminate this condition in glider towing operations.

It is well known that in helicopter operation forward movement, and incidentally forward thrust or drawbar pull, is obtained by forward movement of the cyclic control stick of the helicopter. This causes the axis of the upward thrust or lift of the rotor to be inclined upwardly and forwardly from the vertical thereby providing a forwardly directed horizontal vector. This vector is actually located above the combined center of gravity of the helicopter and the location of the C.G. below the forward thrust vector causes the helicopter to move forwardly rather than merely nose over under the force of the forwardly directed thrust vector.

If a tow line is connected to the helicopter below the forward thrust vector the couple set up by the rearward pull of the tow line, the forward thrust vector and the moment arm between the forward thrust vector and the tow line pull causes a nose down or nose over resultant force on the helicopter.

During take-off operations, the collective pitch lever and the engine throttle are used to provide the necessary upward force to gain operating altitude. This increased upward thrust tends to counteract the nose down tendency produced by the couple between the forward thrust and the tow line pull, as explained above, and operation of the helicopter under these conditions is substantially normal even when towing a glider. In fact, under these conditions, it may be desirable to have the tow cable connection near the bottom of the helicopter so that the tow cable pull will assist the cyclic pitch control in providing the desired forward thrust vector. With the tow cable connection in a position below or on the helicopter C.G. once the helicopter has reached flying altitude and the lift thrust is decreased, as the forward thrust is increased to pick up forward speed the pull of the tow cable, the drag of the helicopter body and the forces exerted by the rotor combine to reduce the amount of stick movement necessary to increase speed. Finally the forces combine in such a manner as to require a rearward movement of the cyclic stick for an increase in speed. This point is the point of stick reversal. Since near the stick reversal point a very small movement of the cyclic stick will produce unnaturally large speed variations, operation of the helicopter near this point is uncomfortable and unnecessarily taxing for the pilot.

It is therefore among the objects of the present invention to provide adjustable aerial towing apparatus for a rotary wing aircraft by means of which the location of the connection of the towing apparatus to the aircraft can be changed to avoid reversal of the operation of the cyclic pitch control during the towing operation.

A further object resides in the provision of aerial towing apparatus of the character indicated, so arranged and constructed that the pilot of the towing aircraft can raise and lower the location of the connection of the towing apparatus to the aircraft to compensate for the effect of the tow line pull on the attitude of the aircraft.

An additional object resides in the provision of adjustable aerial towing apparatus of the character indicated which does not add appreciably to the weight of the towing aircraft, and does not reduce the strength of the towing apparatus or interfere with the tow release mechanism.

Other objects and advantages will become apparent from a consideration of the following description and the appended claims in conjunction with the accompanying drawings wherein:

FIG. 2 is a top plan view of the helicopter and towing apparatus shown in FIG. 1;

FIG. 3 is an elevational view on an enlarged scale of one of the helicopter mounted tow line attachment brackets shown in FIGS. 1 and 2;

FIG. 4 is a fragmentary elevational view of the tow line attachment bracket on a viewing plane substantially at right angles to the viewing plane of FIG. 3;

FIG. 5 is a transverse cross-sectional view taken substantially on a plane indicated by the line 5—5 on FIG. 3;

FIG. 6 is a transverse cross-sectional view substantially on a plane indicated by the line 6—6 on FIG. 4; and, FIG. 7 is a fragmentary longitudinal cross-sectional view taken substantially on a plane indicated by the line 6—6 on FIG. 4.

Figure 1:
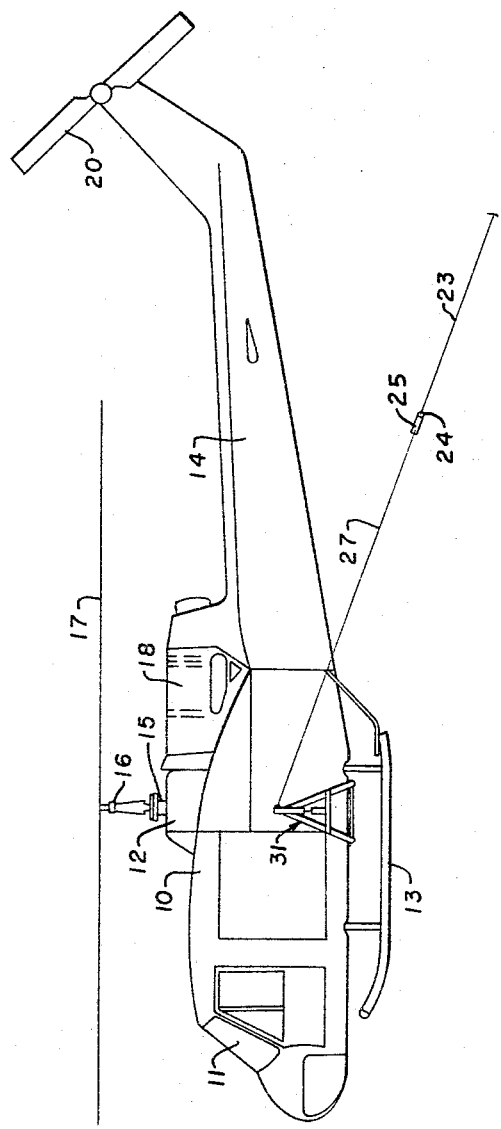
FIG. 1 is a side elevational view of a helicopter with aerial towing apparatus illustrative of the invention applied thereto.

With continued reference to the drawings, the helicopter illustrated is of conventional construction comprising a fuselage 10 having a pilot's compartment 11, a rotor pylon 12, landing skids 13 and a tail boom 14. A rotor shaft 15 extends upwardly from the pylon 12 and carries a rotor including hub 16 and blades 17. The shaft 15 is driven by an engine 18 and pilot operated control sticks are provided for cyclic and collective pitch control of the rotor blades. There is also a pilot actuated engine throttle, which may operate in conjunction with the collective pitch control stick or lever, and at its rearward end the tail boom carries a tail rotor 20 which the pilot can regulate to control turning or yawing movements of the aircraft.

The glider towing apparatus comprises a bridle arrangement 22 connected to the aircraft, a glider tow cable 23 and a latch 24 which is manually and electrically actuable to release the tow cable from the helicopter.

The bridle comprises an equalizing bar or "single tree" 25 disposed below the tail boom 14 and connected at its mid-length location to the release latch 24. Bridle lines or traces 26 and 27 extend from the respective opposite ends of bar 25 forwardly along the corresponding sides of the helicopter and are connected at their forward ends to tow brackets 30 and 31 respectively, mounted on the helicopter.

It has been found that the stick reversal condition described above can be corrected by modifying the tow brackets 30 and 31. As the two modified tow brackets are identical in construction except that one is right hand and one is left hand, a detailed description of one only is considered sufficient for the purposes of this disclosure and the left hand tow bracket 31 has been selected.

As shown in FIG. 4, the tow bracket 31 is of A-frame construction having two legs 34 and 35 which are of tubular construction and diverge downwardly from a common connecting structure 36 at the apex of the frame. The legs 34 and 35 are curved, as shown in FIG. 3, to conform generally to the curvature of the lower portion of the body or fuselage of the helicopter. Lugs, as indicated at 38 and 39 for the leg 35, are secured to the legs 34 and 35 of the tow bracket at locations spaced apart along the lower portions of the legs and these lugs are secured to attachment lugs, as indicated at 40 and 41, projecting from the side of the helicopter fuselage. This arrangement firmly secures the tow brackets to the helicopter.

A reinforcing bar 44, of double channel construction, extends between the legs 34 and 35 between the upper attachment lugs and the top of the bracket and is secured to the legs by suitable means, such as the bolts 45 and 46. It will be noted that the tow bracket is spaced outwardly from the adjacent side of the helicopter and that its upper end is located rearwardly of the rear edge of the doorway 48 so that the towing equipment does not interfere with the door.

The structure 36 comprises a vertical, open ended cylinder disposed between the upper ends of the legs 34 and 35 and welded or otherwise rigidly secured thereto. The upper ends of the legs are cut at an angle or bias to fit closely against the side wall of the cylinder 50 and triangular gussets 51 and 51' are welded in place between the legs and the cylinder to reinforce the bracket.

An inner cylinder 52 is slidably disposed in the vertical cylinder 50, a sleeve or liner 53 of a friction reducing material, such as "Teflon" preferably being disposed between the two cylinders and secured to the inner surface of the outer cylinder 50. An eye bolt 54 extends through and is secured in a diametrical bolt hole in the upper end of cylinder 52, and the forward end of bridle line 27 is secured to this eye bolt. The forward end of line 26 is similarly attached to the right hand bracket 30.

A two-way jack 56 is mounted at its lower end on the cross bar 44 by a bolt 57 extending through the mid-length portion of the bar and comprises a housing or cylinder 58 from the upper end of which the jack stem 60 projects. A disk 61 is secured in the lower end of cylinder 52 and is provided with a concentric opening into which the upper end of stem 60 extends. A pin 62 extends through registering apertures in cylinder 52, disk 61 and stem 60 securing these parts together in operative arrangement.

The jack 56 may be a screw jack, hydraulic jack or other form of mechanism and may be driven by a small electric motor 63. The two motors may be powered from the electrical system of the helicopter and controlled by a manually operated electric switch, not illustrated, in the pilot's compartment. By using this switch to adjust the eye bolts up and down, the location of the attachment points between the bridle and the helicopter can be adjusted to obtain proper operation of the cyclic pitch control for the particular towing operation.

While a particular mechanical embodiment has been herein above described and illustrated in the accompanying drawings for the purpose of disclosing the invention, it is to be understood that the scope of the invention is in no way limited to the embodiment so described and illustrated but is commensurate with the scope of the appended claims.

I claim:

1. In towing apparatus for connecting a towing aircraft to a towed glider, a tow cable connected at one end to said glider, a tow bridle having at one end an equalizing bar connected to the other end of said tow cable and lines extending one from each end of said bar along the correspondingly opposite sides of said aircraft and brackets mounted on said aircraft one at each opposite side thereof for connecting said lines to said aircraft, each of said brackets comprising an A-frame structure secured to the aircraft and including a vertically disposed cylinder, a member slidable in said cylinder and connected at its upper end to the corresponding bridle line, and a power operated jack carried by said A-frame structure and connected to the lower end of said member.

2. In towing apparatus for connecting a towing rotary wing aircraft to a towed glider wherein said towing apparatus comprises a tow cable connected at one end to the glider, a towing bridle connected at one end to the other end of said tow cable and having a pair of lines extending one along each side of the towing aircraft, and brackets secured to said towing aircraft one at each side thereof connected respectively to the ends of said tow bridle lines remote from said tow cable, the improvement comprising a vertically disposed guideway in each bracket, a slide mounted in each guideway for reciprocatory vertical movement and connected to the coeresponding tow bridle line, and a manually controlled reversible jack mounted on each bracket and connected to the corresponding slide for imparting vertical movements to the slide.

3. In combination with a helicopter including a tail boom, a towing apparatus for connecting said helicopter to a towed glider comprising, a pair of brackets secured to said helicopter, one at each side thereof, an equalizing bar disposed below said tail boom, a line connecting each end of said bar to the respective brackets, a tow cable for releasably connecting a glider with the middle of said bar, connecting members on said brackets for said lines and pilot controlled means carried by each said bracket for adjusting the height thereof relative to said helicopter.

References Cited

UNITED STATES PATENTS

| 470,086 | 3/1892 | Taylor | 254—93 |
| 2,954,185 | 9/1960 | Spratt | 244—3 |
| 3,017,138 | 1/1962 | Flint | 244—3 |

FOREIGN PATENTS

| 1,353,830 | 1/1964 | France. | |

MILTON BUCHLER, *Primary Examiner.*

T. MAJOR, *Assistant Examiner.*